(12) United States Patent
Tooman

(10) Patent No.: US 7,225,953 B1
(45) Date of Patent: Jun. 5, 2007

(54) VALVE GATE ASSEMBLY

(75) Inventor: Patrick A. Tooman, Clarkston, MI (US)

(73) Assignee: Plastic Engineering & Technical Services, Inc., Auburn Hills, MI (US)

( * ) Notice: Subject to any disclaimer, the term of this patent is extended or adjusted under 35 U.S.C. 154(b) by 542 days.

(21) Appl. No.: 10/745,441

(22) Filed: Dec. 22, 2003

(51) Int. Cl.
*B22D 41/08* (2006.01)
*C21C 5/42* (2006.01)

(52) U.S. Cl. .................. 222/601; 222/597; 222/594; 425/564

(58) Field of Classification Search ............... 222/591, 222/594, 597, 601, 602; 425/145, 564
See application file for complete search history.

(56) References Cited

U.S. PATENT DOCUMENTS

| | | | |
|---|---|---|---|
| 4,173,448 A | 11/1979 | Rees et al. | |
| 4,285,661 A * | 8/1981 | Yotsutsuji et al. | .......... 425/563 |
| 4,810,184 A | 3/1989 | Gellert et al. | |
| 4,964,795 A | 10/1990 | Tooman | |
| 5,378,138 A | 1/1995 | Onuma et al. | |
| 5,470,219 A | 11/1995 | Yokoyama et al. | |
| 5,783,234 A | 7/1998 | Teng | |
| 5,820,803 A | 10/1998 | Hashimoto | |
| 5,834,041 A | 11/1998 | Sekine et al. | |
| 5,840,231 A | 11/1998 | Teng | |
| 5,846,466 A * | 12/1998 | Abe et al. | .......... 425/566 |
| 5,919,492 A | 7/1999 | Tarr et al. | |
| 6,086,357 A | 7/2000 | Steil et al. | |
| 6,099,767 A | 8/2000 | Tarr et al. | |
| 6,129,541 A | 10/2000 | Takeda | |
| 6,179,604 B1 | 1/2001 | Takeda | |
| 6,294,122 B1 | 9/2001 | Moss et al. | |
| 6,343,925 B1 | 2/2002 | Jenko | |
| 6,464,909 B1 | 10/2002 | Kazmer et al. | |
| 6,514,440 B1 | 2/2003 | Kazmer et al. | |
| 6,638,049 B1 | 10/2003 | Moss et al. | |
| 2003/0155672 A1 | 8/2003 | Kazmer et al. | |
| 2005/0100625 A1* | 5/2005 | Tooman et al. | .......... 425/145 |

* cited by examiner

Primary Examiner—Scott Kastler
(74) Attorney, Agent, or Firm—Bliss McGlynn, P.C.

(57) ABSTRACT

A valve gate assembly is provided for regulating a flow of molten material through a gate and into a mold. The valve gate assembly includes a movable valve having a closed position closing the gate to prevent molten material from entering the mold and an opened position opening the gate to allow molten material to enter the mold. The valve gate assembly further includes a biasing assembly operatively cooperating with the valve and providing a force to urge the valve in the closed position. The valve has a shoulder for cooperating with the molten material to create backpressure to move the valve against the force to the open position.

23 Claims, 3 Drawing Sheets

VALVE GATE ASSEMBLY

BACKGROUND OF THE INVENTION

1. Field of the Invention

The present invention relates generally to valve gates and, more particularly, to a valve gate assembly for regulating a flow of molten material into a cavity of a mold.

2. Description of the Related Art

Injection molding is a widely known manufacturing process used to produce a variety of parts. Injection molding involves introducing a molten material, for example a molten plastic or resin, into a cavity within a mold until the cavity is filled. The molten material hardens in the mold in the shape of inner surfaces of the cavity. After the molten material hardens or cures, the hardened or cured material is removed from the cavity.

For injection molding, a manifold is typically used for conveying molten material from a central injection portion or sprue to a number of cavities or to multiple points within one large cavity of the mold. An example of such a manifold is disclosed in U.S. Pat. No. 4,964,795 to Tooman. In that patent, a manifold has a passageway through which a molten material may pass. The terminal end of the passsageway, called a gate, is in fluid communication with the cavity of the mold.

In addition, a valve nozzle or gate is typically used with the manifold to regulate the flow of molten material into the cavity of the mold. An example of such a valve nozzle or gate is disclosed in U.S. Pat. No. 5,996,618 to Saito. In that patent, a valve nozzle has a spool with a head portion, a shaft portion, and a coil spring, which presses the spool in the direction opposite to the gate such that when a resin pressure is less than a certain fixed level, the spool is pressed by the coil spring in the direction opposite to the gate such that it closes the gate and prevents the flow of molten material through the gate. However, when the resin pressure becomes higher than a certain fixed level, the spool overcomes a pressing force of the coil spring and is caused to protrude outward of the gate of the nozzle head, thereby causing the resin flow path to be opened.

It is desirable to provide a new valve gate that is urged in a closed position and opened without the use of an actuator. It is also desirable to provide a valve gate that has less parts. It is further desirable to provide a valve gate that is relatively cheaper to make. Therefore, there is a need in the art to provide a valve gate that meets these desires.

SUMMARY OF THE INVENTION

Accordingly, the present invention is a valve gate assembly for regulating a flow of molten material through a gate and into a mold. The valve gate assembly includes a movable valve having a closed position closing the gate to prevent molten material from entering the mold and an opened position opening the gate to allow molten material to enter the mold. The valve gate assembly further includes a biasing assembly operatively cooperating with the valve and providing a force to urge the valve in the closed position. The valve has a shoulder for cooperating with the molten material to create backpressure to move the valve against the force to the open position.

One advantage of the present invention is that a valve gate assembly is provided for regulating a flow of molten material into a mold that is opened without the use of an actuator. Another advantage of the present invention is that the valve gate assembly has a valve such as a pin that is spring loaded closed and opened due to back pressure of molten material to be injected. Yet another advantage of the present invention is that the valve gate assembly has less parts. Still another advantage of the present invention is that the valve gate assembly is relatively inexpensive compared to conventional valve gates.

Other features and advantages of the present invention will be readily appreciated, as the same becomes better understood, after reading the subsequent description taken in conjunction with the accompanying drawings.

DESCRIPTION OF THE PREFERRED EMBODIMENT(S)

Figure 1:
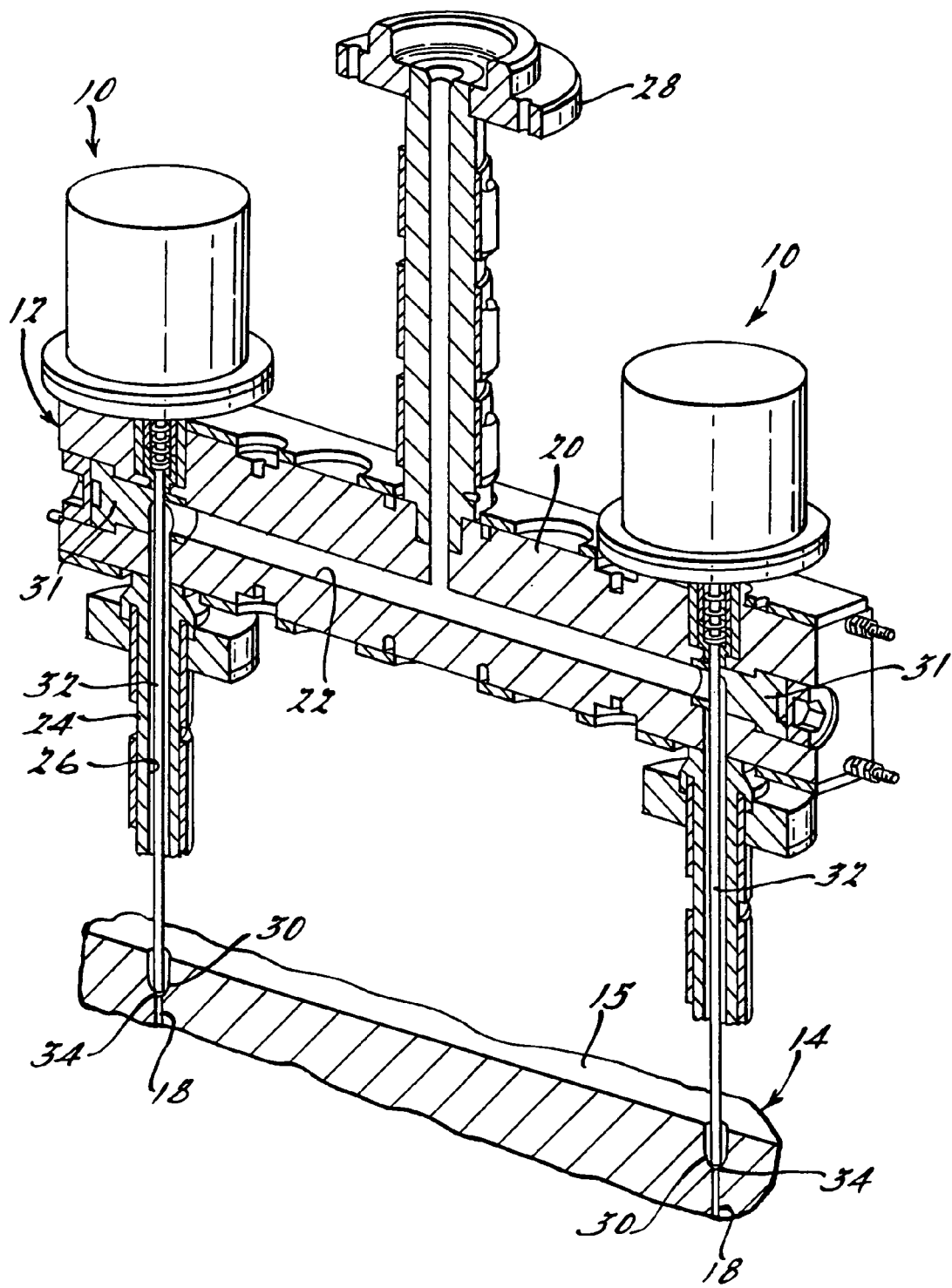
FIG. 1 is a fragmentary perspective view of a valve gate assembly, according to the present invention, illustrated in operational relationship with a manifold assembly and mold.

Referring to the drawings, and in particular FIG. 1, one embodiment of a valve gate assembly 10, according to the present invention, is shown for a manifold assembly, generally indicated at 12, and a mold, generally indicated at 14. The mold 14 has a first mold half 15 and a second mold half (not shown) defining a cavity (not shown) therein. The mold 14 also has at least one, preferably a plurality of openings 18 extending through the first mold half 15 and fluidly communicating with the cavity. It should be appreciated that, when a molten material (not shown) is introduced into the cavity via the openings 18, the mold 14 contains the molten material, and when the molten material hardens or cures, it holds a shape similar to that of the cavity 16. It should also be appreciated that the mold 14 is conventional and known in the art.

The manifold assembly 12 includes a manifold 20 having a manifold flow passage 22. The manifold assembly 12 also includes as least one, preferably a plurality of nozzles 24 extending downwardly from the manifold 20 and having a nozzle flow passage 26 fluidly communicating with the manifold flow passage 22. The manifold assembly 12 further a sprue 28 extending radially outward from the manifold 20 for facilitating the introduction of molten material into the manifold 20. The flow passages 22 and 26 can be of any appropriate shape. The nozzle flow passage 26 narrows and terminates at a gate 30. The manifold 12 and/or the nozzles 24 may have a generally circular or rectangular cross-sectional shape. It should be appreciated that an end plug 31 is used to seal the end of the manifold flow passage 22.

As illustrated in FIG. 1, the mold 14 is positioned such that the gate 30 is positioned adjacent a respective opening 18 of the mold 14 to allow the nozzle flow passage 26 fluid communication with the cavity 16. The valve gate assembly 10 cooperates with the gate 30 of the manifold assembly 12 to control the flow of molten material from the manifold assembly 12 to the mold 14. It should be appreciated that, although more than one valve gate assembly 10 may be used with the manifold assembly 12, only one valve gate assembly 10 is used with one gate 30 of the manifold assembly 12. It should also be appreciated that the molten material may be of a plastic, metal, wood fibers and plastic, etc. and is injected into the sprue 28 of the manifold assembly 20 from a molding machine (not shown). It should further be appreciated that, except for the valve gate assembly 10, the manifold assembly 12 is conventional and known in the art.

Figure 2:
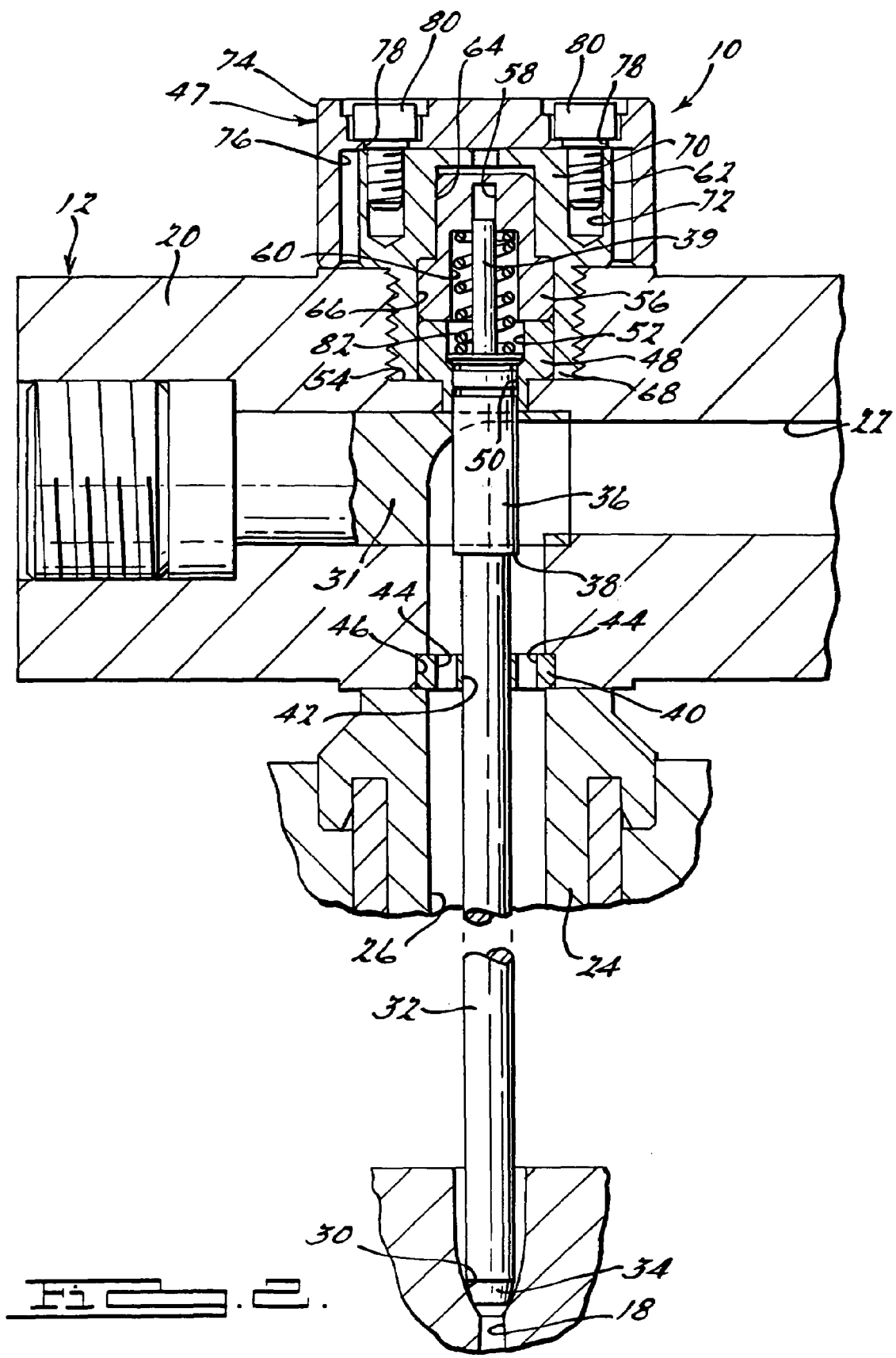
FIG. 2 is a fragmentary elevational view of the valve gate assembly and a portion of the manifold assembly and mold of FIG. 1 illustrating the valve gate assembly in a closed position.

Referring to FIG. 2, the valve gate assembly 10, according to the present invention, includes a moveable valve such as a pin or a rod-like member 32 cooperating with the gate 30 to regulate the flow of molten material into the cavity 16 the mold 14. The pin 32 is generally cylindrical in shape with a generally circular cross-sectional shape. The pin 32 extends axially. In the embodiment illustrated, the pin 32 is axially aligned with the gate 30 and is at least partially disposed within the nozzle flow passage 26. The cross section of the pin 32 is preferably smaller than the cross section of the flow passage 26 such that the molten material may flow around the pin 32. Furthermore, the pin 32 includes a lower end 34 that opens and closes the gate 30. The pin 32 has a predetermined diameter. The pin 32 also has an enlarged portion 36 extending axially of a diameter greater than the predetermined diameter and forms a lower shoulder 38 for a function to be described. The enlarged portion 36 extends through the plug 31 and the manifold flow passage 22. The pin 32 further has an upper end 39 extending axially from the enlarged portion 36 and of a diameter less than the predetermined diameter for a function to be described. The upper end 39 may be offset relative to a longitudinal axis of the pin 32. The pin 32 is made of a metal material. It should be appreciated that the pin 32 is a monolithic structure being integral, unitary, and one-piece.

Figure 3:
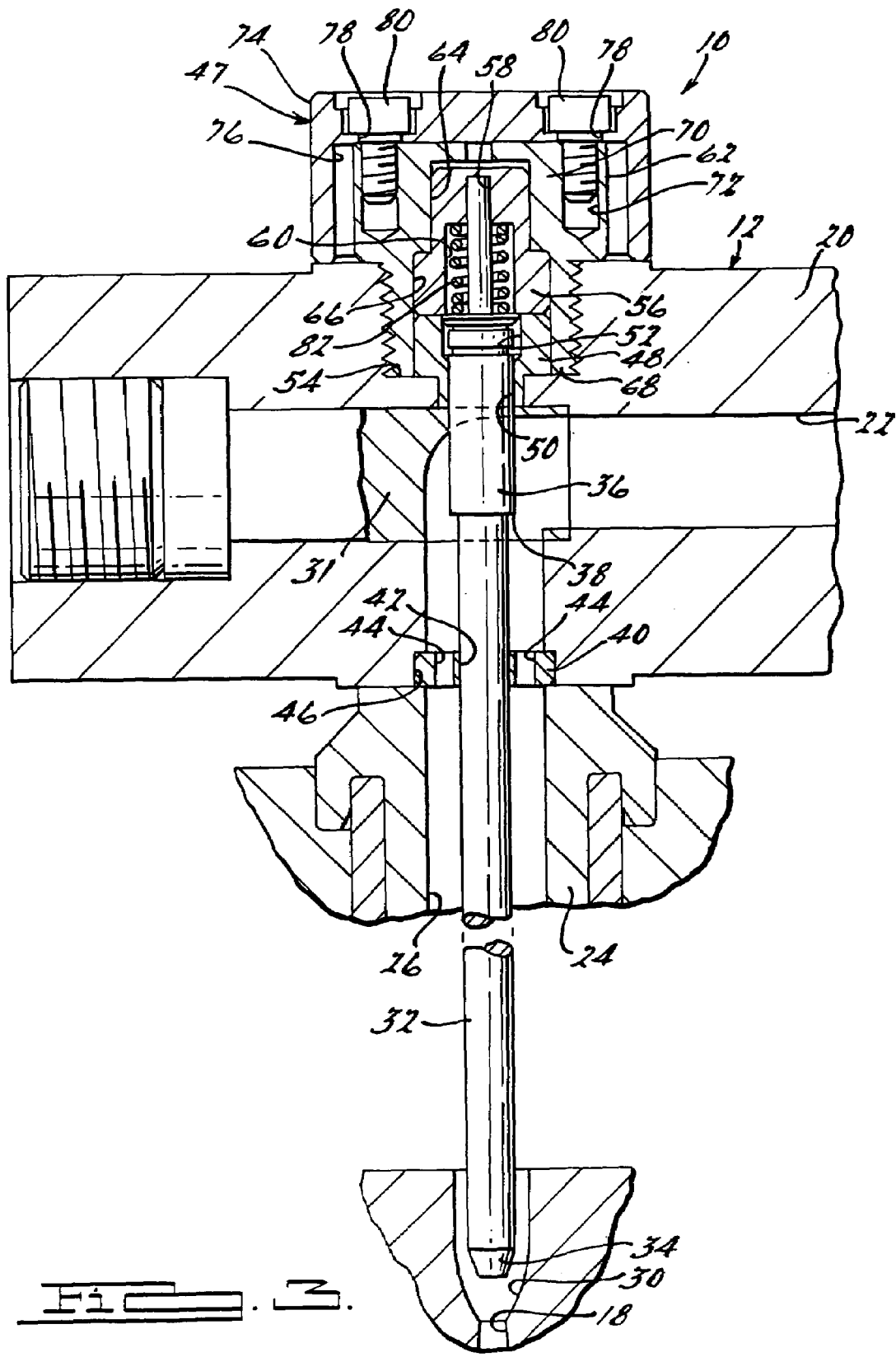
FIG. 3 is a view similar to FIG. 2 illustrating the valve gate assembly in an open position.

The pin 32 can move axially within the flow passage 26 toward and away from the gate 30 in a manner to be described. The pin 32 has a closed position, wherein the lower end 34 is positioned within the gate 30 as illustrated in FIG. 2. The pin 32 has an open position, wherein the lower end 34 is positioned away from the gate 30 as illustrated in FIG. 3. Preferably, the lower end 34 is of a size complementary to that of the gate 30, allowing the lower end 34 to block and substantially seal the gate 30 when the pin 32 is in its closed position. As such, when the pin 32 is in the closed position, the lower end 34 seals the gate 30 and molten material will not flow through the gate 30. When the pin 32 is in the open position, the lower end 34 opens the gate 30 and molten material will flow through the gate 30 into the mold 14.

The valve gate assembly 10 also includes a valve pin guide 40 for guiding the pin 32 during axial movement between the open and closed positions. The valve pin guide 40 is generally circular in shape. The valve pin guide 40 has a central aperture 42 extending axially therethrough to receive the pin 32. The valve pin guide 40 also has at least one, preferably a plurality of material apertures 44 extending axially therethrough to allow molten material to pass. The material apertures 44 are spaced radially from the central aperture 42 and spaced circumferentially thereabout. The valve pin guide 40 is made of a metal material. The valve pin guide 40 is disposed in a recess 46 of the manifold 20 adjacent the nozzle 24. It should be appreciated that the valve pin guide 40 is fixed relative to the manifold 20 and nozzle 24.

The valve gate assembly 10 also includes a biasing assembly 47 for urging the pin 32 in the closed position. In the embodiment illustrated in FIG. 2, the biasing assembly 47 includes a spring retainer 48. The spring retainer 48 is generally cylindrical in shape with a generally circular cross-sectional shape. The spring retainer 48 has a central aperture 50 extending axially therethrough to receive an upper end of the enlarged portion 36 of the pin 32. The spring retainer 48 also has a cavity portion 52 extending axially therein and of a diameter greater than the central aperture 50. The spring retainer 48 is made of a metal material. The spring retainer 48 is disposed in a recess 54 of the manifold 20 adjacent the nozzle 24. It should be appreciated that the spring retainer 48 is fixed relative to the manifold 20.

The biasing assembly 47 also includes a pin guide 56 to guide the upper end 39 of the pin 32. The pin guide 56 is generally cylindrical in shape with a generally circular cross-sectional shape. The pin guide 56 has a first cavity portion 58 extending axially therein to receive the upper end 39 of the pin 32. The pin guide 56 also has a second cavity portion 60 extending axially therein and of a diameter greater than the first cavity portion 58. The pin guide 56 is made of a metal material. The pin guide 56 is disposed in the recess 54 of the manifold 20 adjacent the spring retainer 48. It should be appreciated that the pin guide 56 is fixed relative to the manifold 20.

The biasing assembly 36 includes a retainer 62 to retain the pin guide 56 and spring retainer 48 in the recess 54 of the manifold 20. The retainer 62 is generally cylindrical in shape with a generally circular cross-sectional shape. The retainer 62 has a first cavity portion 64 extending axially therein to receive an upper end of the pin guide 56. The retainer 62 also has a second cavity portion 66 extending axially therein and of a diameter greater than the first cavity portion 64 to receive a lower portion of the pin guide 56 and the upper portion of the spring retainer 48. The retainer 62 also has a threaded lower portion 68 extending axially to threadably engage the recess 54. The retainer 62 has an upper portion 70 of a diameter greater than the lower portion, 68 with at least one, preferably a plurality of threaded apertures 72 extending therein. The retainer 62 is made of a metal material. It should be appreciated that the lower portion 68 of the retainer 62 threadably engages the recess 54 of the manifold 20 and the upper portion 70 abuts the manifold 20. It should also be appreciated that the retainer 62 is fixed relative to the manifold 20.

The biasing assembly 47 also includes a preload pad 74 disposed over the retainer 62 to preload the retainer 62. The preload pad 74 is generally cylindrical in shape with a generally circular cross-sectional shape. The preload pad 74 has a cavity portion 76 extending axially therein to receive the upper portion 70 of the retainer 62. The preload pad 74 has at least one, preferably a plurality of apertures 78 extending axially therethrough. The preload pad 74 is made of a metal material. The preload pad 74 is disposed over the upper portion 70 of the retainer 62 and the lower end of the preload pad 74 contacts the manifold 20 adjacent the spring retainer 48. It should be appreciated that the preload pad 74 is fixed relative to the manifold 20.

The biasing assembly 47 includes at least one, preferably a plurality of fasteners 80 to secure the preload pad 74 to the retainer 62 to preload the retainer 62. The fasteners 80 extend through the apertures 78 in the preload pad 74 and threadably engage the threaded apertures 72 in the retainer 62. It should be appreciated that the fasteners 80 are conventional and known in the art.

The biasing assembly 47 further includes a spring 82 to urge the pin 32 toward the closed position. The spring 82 is of a coil type. The spring 82 is disposed about the upper end 39 of the pin 32 and in the cavity portions 52 and 60 of the spring retainer 48 and pin guide 56, respectively. The spring contacts the upper end of the enlarged portion 36 of the pin 32 and the pin guide 56. The spring 82 has a predetermined spring force. It should be appreciated that the spring 82 is conventional and known in the art.

In operation, the pin 32 is typically in a closed position with the gate 30 and molten material is prevented from flowing into the cavity of the mold 14 as illustrated in FIG. 2. When molten material is injected into the manifold 20 by the molding machine, the molten material flows through the manifold flow passage 22 past the enlarged portion 36 of the pin 32 and through the material apertures 44 of the valve pin guide 40 into the nozzle flow passage 26 of the nozzle 24 to the gate 30. Some of the molten material flows axially back up along the pin 32 to engage the shoulder 38 of the enlarged portion 36 of the pin 32. This creates back pressure. When the back pressure exceeds the predetermined spring force of the spring 82, the pin 32 moves axially, thereby compressing the spring 82 and moving the lower end 34 away from the gate 30 to an open position as illustrated in FIG. 3. When the pin 32 is in the open position, the molten material flows through the gate 30 and into the cavity of the mold 14. When the back pressure diminishes below the predetermined spring force of the spring 82, the spring 82 moves the pin 32 such that the lower end 34 moves toward the gate 30 to the closed position as illustrated in FIG. 2. It should be appreciated that the back pressure is related to the shot pressure or injection pressure of the molten material by the molding machine.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A valve gate assembly for regulating a flow of molten material through a gate and into a mold, said valve gate assembly comprising:
    a movable valve having a closed position closing the gate to prevent molten material from entering the mold and an opened position opening the gate to allow molten material to enter the mold;
    a biasing assembly operatively cooperating with said valve and providing a force to urge said valve toward the gate in the closed position; and
    said valve having a shoulder disposed in a flow passage to the gate and having a diameter less than a diameter of the flow passage for cooperating with the molten material to allow the molten material to flow past said shoulder and to create backpressure to move said valve against the force to the open position.

2. A valve gate assembly as set forth in claim 1 wherein said biasing assembly comprises a spring disposed about said valve.

3. A valve gate assembly as set forth in claim 2 wherein said spring comprises a coil spring.

4. A valve gate assembly as set forth in claim 1 including a valve guide to guide axial movement of said valve.

5. A valve gate assembly as set forth in claim 4 wherein said valve guide has a central aperture extending axially therethrough to receive said valve.

6. A valve gate assembly as set forth in claim 5 wherein said valve guide has at least one material aperture spaced radially from said central aperture to allow molten material to pass therethrough.

7. A valve gate assembly as set forth in claim 1 wherein said valve comprises a pin having a lower end adapted to move toward and away from the gate.

8. A valve gate assembly as set forth in claim 7 wherein said pin has an enlarged diameter portion forming said shoulder.

9. A valve gate assembly as set forth in claim 2 wherein said biasing assembly further comprises a spring retainer for retaining one end of said spring.

10. A valve gate assembly as set forth in claim 9 wherein said biasing assembly further comprises a valve guide disposed about said valve and contacting another end of said spring.

11. A valve gate assembly for regulating a flow of molten material through a gate and into a mold, said valve gate assembly comprising:
    a movable valve having a closed position closing the gate to prevent molten material from entering the mold and an opened position opening the gate to allow molten material to enter the mold;
    a biasing assembly operatively cooperating with said valve and providing a force to urge said valve in the closed position;
    said valve having a shoulder for cooperating with the molten material to create backpressure to move said valve against the force to the open position; and
    wherein said biasing assembly comprises a spring disposed about said valve, a spring retainer for retaining one end of said spring, a valve guide disposed about said valve and contacting another end of said spring, and a retainer to retain said spring retainer and said valve guide to a manifold assembly.

12. A valve gate assembly as set forth in claim 11 wherein said biasing assembly further comprises a preload pad cooperating with said retainer to preload said retainer.

13. A manifold assembly comprising:
    a manifold having a manifold flow passage;
    a nozzle extending from said manifold and having a nozzle flow passage fluidly communicating with said manifold flow passage and terminating at a gate;
    a movable valve at least partially disposed in said manifold flow passage and said nozzle flow passage and having a closed position closing said gate to prevent molten material from entering a mold and an opened position opening said gate to allow molten material to enter the mold;
    a biasing assembly connected to said manifold and operatively cooperating with said valve to provide a force to urge said valve toward said gate in the closed position; and
    said valve having a shoulder disposed in said manifold flow passage and having a diameter less than a diameter of said manifold flow passage for cooperating with the molten material to allow the molten material to flow past said shoulder and to create backpressure to move said valve against the force to the open position.

14. A manifold assembly as set forth in claim 13 wherein said biasing assembly comprises a spring disposed about said valve.

15. A manifold assembly as set forth in claim 13 including a valve guide to guide axial movement of said valve.

16. A manifold assembly as set forth in claim 15 wherein said valve guide has a central aperture extending axially therethrough to receive said valve.

17. A manifold assembly as set forth in claim 16 wherein said valve guide has at least one material aperture spaced radially from said central aperture to allow molten material to pass therethrough.

18. A manifold assembly as set forth in claim 13 wherein said valve comprises a pin having a lower end adapted to move toward and away from the gate.

19. A manifold assembly as set forth in claim 18 wherein said pin has an enlarged diameter portion forming said shoulder.

20. A manifold assembly as set forth in claim 14 wherein said biasing assembly further comprises a spring retainer disposed in a recess of said manifold for retaining one end of said spring.

21. A manifold assembly as set forth in claim 20 wherein said biasing assembly further comprises a valve guide disposed in the recess about said valve and for retaining another end of said spring.

22. A manifold assembly comprising:
a manifold having a manifold flow passage;
a nozzle extending from said manifold and having a nozzle flow passage fluidly communicating with said manifold flow passage and terminating at a gate;
a movable valve at least partially disposed in said manifold flow passage and said nozzle flow passage and having a closed position closing said gate to prevent molten material from entering a mold and an opened position opening said gate to allow molten material to enter the mold;
a biasing assembly connected to said manifold and operatively cooperating with said valve to provide a force to urge said valve in the closed position;
said valve having a shoulder for cooperating with the molten material to create backpressure to move said valve against the force to the open position; and
wherein said biasing assembly comprises a spring disposed about said valve, a spring retainer disposed in a recess of said manifold for retaining one end of said spring, a valve guide disposed in the recess about said valve and for retaining another end of said spring, and a retainer to engage the recess and retain said spring retainer and said valve guide to said manifold.

23. A manifold assembly as set forth in claim 22 wherein said biasing assembly further comprises a preload pad cooperating with said retainer to preload said retainer.

* * * * *